(12) United States Patent
Leeb et al.

(10) Patent No.: US 8,507,823 B2
(45) Date of Patent: Aug. 13, 2013

(54) BURNER BODY COMPRISING A SECURING SYSTEM; TIG WELDING TORCH COMPRISING SUCH A BURNER BODY

(75) Inventors: Josef Leeb, Pettenbach (AT); Josef Raxendorfer, Steinerkirchen (AT); Manfred Hubinger, Kremsmünster (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 13/814,993

(22) PCT Filed: Jul. 1, 2011

(86) PCT No.: PCT/AT2011/000290
§ 371 (c)(1),
(2), (4) Date: Feb. 8, 2013

(87) PCT Pub. No.: WO2012/019208
PCT Pub. Date: Feb. 16, 2012

(65) Prior Publication Data
US 2013/0134134 A1     May 30, 2013

(30) Foreign Application Priority Data
Aug. 9, 2010 (AT) ................................ A 1337/2010

(51) Int. Cl.
*B23K 9/29* (2006.01)
*B23K 9/32* (2006.01)
*B23K 9/167* (2006.01)
*F16B 21/02* (2006.01)
*F16B 21/16* (2006.01)

(52) U.S. Cl.
USPC ........................................................ 219/75

(58) Field of Classification Search
USPC .......... 219/70, 74, 75, 121.48, 121.5, 121.52, 219/137.31, 137.42, 137.61, 137.62, 137.63, 137.8, 137.9; 403/83, 104, 164, 165, 355
See application file for complete search history.

(56) References Cited

U.S. PATENT DOCUMENTS

| 3,689,733 A | 9/1972 | Matasovic |
| 3,893,274 A | 7/1975 | Salisbury |

(Continued)

FOREIGN PATENT DOCUMENTS

| DE | 32 47 091 | 11/1983 |
| GB | 1 568 790 | 6/1980 |
| JP | 10 099968 | 4/1998 |

OTHER PUBLICATIONS

International Search Report of PCT/AT2011/000290, date of mailing Nov. 7, 2011.

(Continued)

*Primary Examiner* — Geoffrey S Evans
(74) *Attorney, Agent, or Firm* — Collard & Roe, P.C.

(57) ABSTRACT

The invention relates to a securing element (30) arranged between a gas element (32) and a current element (33) of the plug-in element (28). A fixing element (34) is arranged in the coupling (29) of the torch handle and meshes with said securing element (30), and, for guiding over said fixing element (34) arranged in the coupling (29), the gas element (32) has a diameter smaller than those of the securing element (30) and of the current element (33). Said securing element (30) can be guided over the fixing element (34) using a flat area (35), while the gas element (32) is arranged in a gas bore hole (37) in the coupling (29) in a sealing manner. The position of the torch body (27) can be freely adjusted by means of a manual rotational movement, said fixing element (34) being guided in a circumferential groove (36) in said securing element (30).

14 Claims, 5 Drawing Sheets

(56) References Cited

U.S. PATENT DOCUMENTS

| | | | |
|---|---|---|---|
| 4,049,943 A | 9/1977 | Pratt | |
| 4,212,559 A | 7/1980 | Persson | |
| 4,278,312 A | 7/1981 | Buffa | |
| 4,443,683 A * | 4/1984 | Watts | 219/74 |
| 4,549,068 A * | 10/1985 | Kensrue | 219/137.63 |
| 5,260,546 A * | 11/1993 | Ingwersen et al. | 219/137.31 |
| 5,338,917 A * | 8/1994 | Stuart et al. | 219/137.63 |
| 5,380,980 A * | 1/1995 | Colling | 219/137.31 |
| 6,706,994 B1 | 3/2004 | Sloan | |
| 6,995,331 B2 * | 2/2006 | Samler | 219/75 |
| 2006/0226133 A1 | 10/2006 | Giese et al. | |
| 2010/0012637 A1 | 1/2010 | Jaeger | |

OTHER PUBLICATIONS

Austrian Office Action dated Jan. 17, 2011 in Austrian Patent Application No. A 1337/2010 along with an English translation of same.

* cited by examiner

BURNER BODY COMPRISING A SECURING SYSTEM; TIG WELDING TORCH COMPRISING SUCH A BURNER BODY

CROSS REFERENCE TO RELATED APPLICATIONS

This application is the National Stage of PCT/AT2011/000290 filed on Jul. 1, 2011, which claims priority under 35 U.S.C. §119 of Austrian Application No. A 1337/2010 filed on Aug. 9, 2010, the disclosure of which is incorporated by reference. The international application under PCT article 21(2) was not published in English.

The invention relates to a securing system of a torch body of a TIG welding torch to a torch handle, wherein the torch body comprises a cylindrical plug-in element including a securing element and the torch handle comprises a coupling for detachably receiving the plug-in element, and wherein at least the media gas and current can be transmitted via said securing system.

Similarly, the invention relates to a torch body for the securing system of a TIG welding torch.

The invention also relates to a TIG welding torch comprising said securing system and said torch body.

Different welding torches are preferably used as a function of the requirements of the welding process to be performed. In order not to have to exchange the whole welding torch with the hose pack attached, the torch bodies—which form part of the welding torch—are designed to be exchangeable. TIG welding torches, in particular, have to be exchanged quite frequently due to the high loads. Appropriate devices for changing a torch body of a TIG welding torch are known from the prior art.

Thus, U.S. Pat. No. 4,049,943 shows the exchange of torch bodies, wherein both an electrode holder and a TIG torch body can be fastened to the coupling that is connected to the hose pack. The plug-in element of the torch body, which is received in the coupling, is secured via balls. These balls are disposed within the coupling, engaging a groove of the plug-in element. During the fixation of the plug-in element, a valve is activated to transmit the gas from the coupling into the torch body. This, in particular, involves the drawbacks of the balls making the coupling larger and a complex valve prone to failures being required.

From U.S. Pat. No. 6,706,994 B1, a change of the torch body is, furthermore, known. There, a separate quick-lock is provided for the individual media so as to make the torch body exchangeable. The quick-locks are protected by half-shells. This involves the disadvantage that several steps are required to change the torch body, since at first the half-shells have to be removed and each quick-lock has to be opened individually. The separate conductance of media also increases the structural size of the torch and prevents changes of the position of the torch body.

U.S. 2010/0012637 A1 discloses a securing system of a torch body of a welding torch to a torch handle, via which gas and current can be transmitted. That construction involves the drawback that the position of the torch body can no longer be freely chosen after its fixation.

The object of the invention resides in designing the torch body of a TIG welding torch to be exchangeable, while keeping the structural dimensions of the TIG welding torch unchanged.

This object is achieved in that the securing element is arranged between a gas element and a current element of the plug-in element, wherein a fixing element that meshes with the securing element is arranged in the coupling of the torch handle, and that the gas element, for guiding over the fixing element arranged in the coupling, has a diameter smaller than those of the securing element and the current element, and that the securing element comprises a flat area such that the securing element can be guided over the fixing element by said flat area and the gas element is, at the same time, sealingly arranged in a gas bore of the coupling, and the position of the torch body can be freely adjusted by means of a manual rotational movement, said fixing element being guided in a circumferential groove of the securing element.

This offers the advantage that the torch body can be quickly changed without using a tool, by a simple plug-in and rotational movement. This also enables the torch body to be easily adapted to the required performance. Furthermore, this will result in short downtimes during replacement, for instance if damage has occurred to the torch body. It is also possible in an advantageous manner to quickly adapt the position of the torch body for the welding operation to the workpiece in order to ensure optimum accessibility at all times. Another advantage is that existing torch handles can be retrofitted due to the space-saving structure of the securing system. The size of the existing TIG welding torch will thus not be changed by the securing system according to the invention. But it is also advantageous that the torch body cannot be fixed before gas-sealing is achieved, thus automatically ensuring gas tightness for any position. Another advantage is that different welding torch performance classes are provided by just a single hose pack via the selection of the respective replacement torch body. This offers the advantage that no interfering contours will be formed outside of the torch handle. The free adjustability of the position of the torch body by a manual rotational movement ensures that the position is exclusively adjusted by the rotational movement, with the locking of the torch body being effected via the fixing element.

It is also advantageous if a cone is arranged between the groove and a web of the securing element, said cone being designed to taper towards the groove such that the guidance for the adjustment of the position of the torch body will be improved, and the plug-in element will be held in the coupling, by the cone.

In an advantageous manner, a feelable position will be reached by the measure that a stop is arranged on the end of the plug-in element opposite the gas element such that the torch body can be secured by the rotational movement and the position can be adjusted so as to ensure gas tightness.

By the measure that a spring element is positioned upstream of the stop, an additional current conduction will be achieved in an advantageous manner via the stop and the end side of the coupling, since the spring element will ensure safe contact. At the same time, a pressure will be built up between the cone and the fixing element, thus rendering difficult any undesired rotation of the position of the torch body.

For tightness reasons, it will also be advantageous if a groove for a sealing ring is provided in the gas element. Besides, easy checking of the sealing ring will be possible, since the latter is arranged on the plug-in element of the exchangeable torch body. The sealing ring will thus remain on the plug-in element during an exchange so as to enable the user to check, and optionally replace, the same in a simple manner.

By the measure that the gas element has a flat area in alignment with the flat area of the securing element, a better recognition of the flat area on the securing element will advantageously be achieved.

By the measure that two concentric bores are provided in the coupling for the plug-in element, with one bore being designed as a gas bore and the further bore being designed as a current bore, an ease reception of the plug-in element as well as easy sealing and an easy current conduction will be achieved.

It is also advantageous that the fixing element is arranged in the current bore in the form of a circular segment and reduces a diameter of the current bore at this point, thus simultaneously accomplishing fixation and current conduction.

By the measure that the coupling is cylindrically designed and a parallelepiped is formed about the coupling in the region of the fixing element, it is advantageously achieved that the fixing element can be installed from outside while the circular segment is, at the same time, formed within the current bore. The fixing element can thus also be easily replaced after having become excessively worn by the rotational movements.

The object of the invention is also achieved in a torch body as indicated in that the plug-in element of the torch body is comprised of a gas element, a current element and an interposed securing element, wherein the position of the torch body is infinitely adjustable by a manual rotational movement.

Advantages in this respect and in respect to the measures defined in the subclaims can be taken from the advantages already described in connection with the securing system.

Furthermore, the object of the invention in a TIC welding torch as indicated is achieved in that the torch body is insertable into the torch handle in a manner rotated by 180° relative to the usual welding position of the TIC welding torch and with the flat area of the securing element over the fixing element, wherein the torch body is secured by a rotational movement and the welding position is adjustable via said rotational movement.

The present invention will be explained in more detail by way of example with reference to the annexed schematic drawings. Therein:

In the figures of the drawing, identical parts of the exemplary embodiment bear the same reference numerals.

Figure 1:
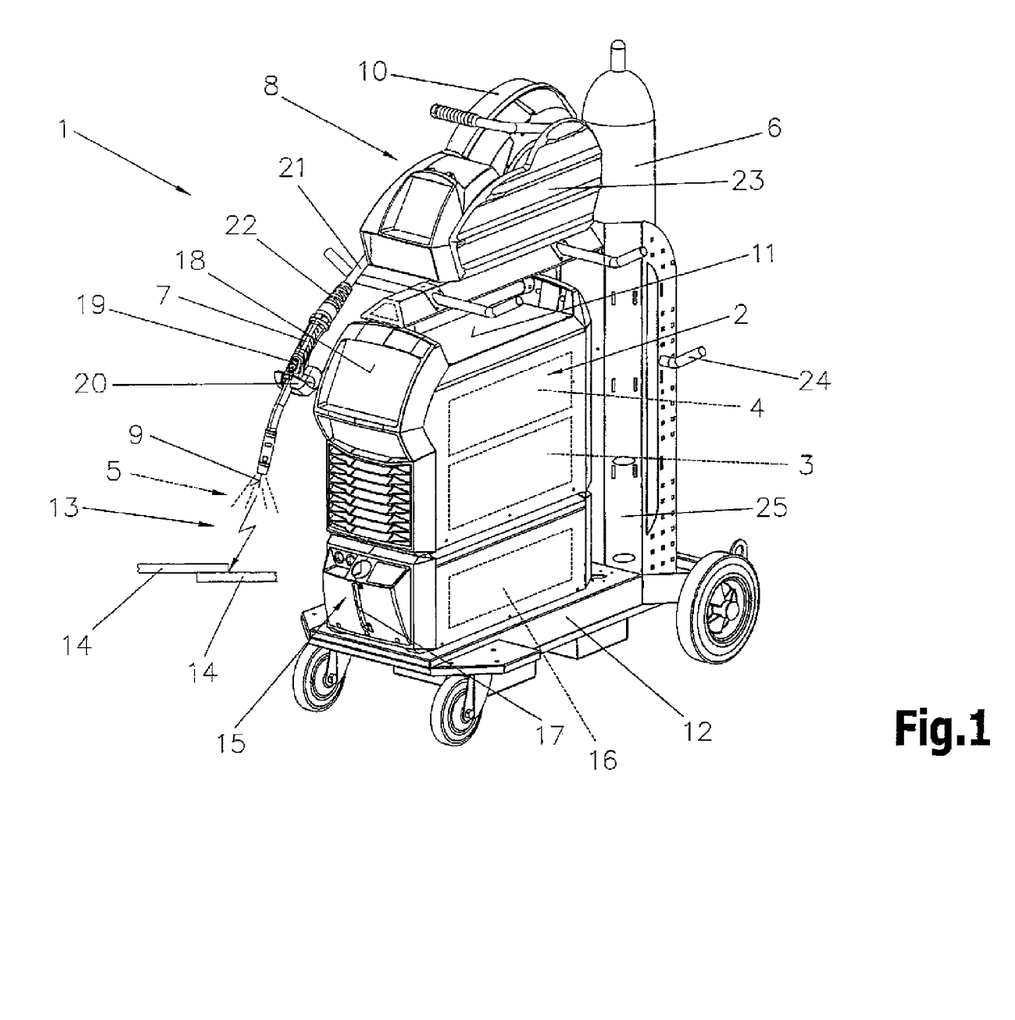
FIG. 1 is a schematic illustration of a welding machine or welding apparatus.

FIG. 1 depicts a welding apparatus 1, or welding machine, for various processes or methods such as, e.g., MIG/MAG welding or TIG welding, or electrode welding methods, double-wire/tandem welding methods, plasma or soldering methods etc.

The welding apparatus 1 comprises a power source 2 including a power element 3 disposed therein, a control device 4, and further components and lines such as a switch member, control valves etc., which are not illustrated. The control device 4 is, for instance, connected with a control valve arranged in a feed line for a gas 5, in particular a protective gas such as, for instance, carbon dioxide, helium or argon and the like, between a gas reservoir 6 and a welding torch 7 or a torch.

In addition, a wire feeder 8, which is usually employed in MIG/MAG welding, can be activated by the control device 4, wherein a filler material or a welding wire 9 is fed from a storage drum 10, or a wire coil, into the region of the welding torch 7 via a feed line. It is, of course, possible to integrate the wire feeder 8 in the welding apparatus 1 and, in particular, in the housing 11 of the power source 2, as is known from the prior art, rather than designing the same as an accessory device placed on a movable carriage 12 as illustrated in FIG. 1. This is referred to as a compact welding apparatus 1. In this case, it is also possible to place the wire feeder 8 directly on the welding apparatus 1, i.e. design the upper side of the housing 11 of the power source 2 so as to receive the wire feeder 8, in which case the movable carriage 12 may be omitted.

It is also possible for the wire feeder 8 to supply the welding wire 9 or filler material to the process site outside the welding torch 7, to which end a non-consumable electrode is preferably arranged within the welding torch 7, as is common with TIG welding.

The power required for building up an electric arc 13, in particular an operative electric arc, between the electrode, or welding wire 9, and a workpiece 14 preferably comprised of one or several parts is supplied from the power element 3 of the power source 2 to the welding torch 7, in particular the electrode or the welding wire 9, via a welding line, not illustrated, wherein the workpiece 14 to be welded, via a further welding line for the further potential, particularly the ground cable, is connected to the power source 2 (not illustrated) so as to enable a power circuit for a process to build up over the electric arc 13 or the plasma jet formed. When using a torch having an internal electric arc 13, the two welding lines, not illustrated, are conducted to the torch so as to enable a suitable power circuit to build up within the torch, as may be the case with plasma burners. For cooling the welding torch 7, the welding torch 7 can be connected to a fluid reservoir, in particular a water reservoir 16 including a level indicator 17, via a cooling device 15, by interposing possible components like a flow control, wherein, when initiating the welding torch 7 of the cooling device 15, a fluid pump used for the fluid contained in the water reservoir 16 is, in particular, started in order to enable cooling of the welding torch 7. As is shown in the illustrated exemplary embodiment, the cooling device 15 is positioned on the movable carriage 12, with the power source 2 being subsequently placed thereon. The individual components of the welding installation, i.e. the power source 2, the wire feeder 8 and the cooling device 15, are configured in such a manner as to comprise corresponding projections and recesses to enable their stacking or placing on each other.

The welding apparatus 1, in particular the power source 2, further comprises an input and/or output device 18, via which the most diverse welding parameters, operating modes or welding programs of the welding apparatus 1 can be set or called and indicated, respectively. In doing so, the welding parameters, operating modes or welding programs set via the input and/or output device 18 are transmitted to the control device 4, which will subsequently activate the individual components of the welding installation or welding apparatus 1 and/or preset the respective values required for control. In doing so, it is also possible that, when using a respective welding torch 7, setting procedures can also be effected via the welding torch 7, to which end the welding torch 7 is equipped with a welding torch input and/or output device 19. In a preferred manner, the welding torch 7 in this case is connected to the welding apparatus 1 and, in particular, the power source 2 or the wire feeder 8 via a data bus, in particular a serial data bus. To start the welding process, the welding torch 7 in most cases comprises a starter switch, not illustrated, such that the electric arc 13 can be ignited by operating the starter switch. In order to be protected against the strong heat radiation from the electric arc 13, the welding torch 7 may be equipped with a heat protection shield 20.

In the exemplary embodiment illustrated, the welding torch 7 is further connected with the welding apparatus 1 or welding installation via a hose pack 21, said hose pack 21 being fastened to the welding torch 7 via an anti-buckling means 12. The hose pack 21 houses the individual lines such as, for instance, the supply line(s) for the welding wire 9, for the gas 8, for the cooling circuit, for data transmission etc., leading from the welding apparatus 1 to the welding torch 7, whereas the ground cable is preferably separately connected to the power source 2. The hose pack 21 is connected to the power source 2 or the wire feeder 8 via a coupling device not illustrated, whereas the individual lines in the hose pack 21 are fastened to or in the welding torch 7 by the aid of an anti-buckling means. In order to ensure an appropriate strain relief of the hose pack 21, the hose pack 21 can be connected to the housing 11 of the power source 2 or the wire feeder 8 via a strain relief device not illustrated.

Basically, not all of the previously mentioned components need to be used or employed for the various welding methods or welding apparatus 1 such as, e.g., TIG devices or MIG/MAG apparatus or plasma devices. Thus, it is, for instance, possible to devise the welding torch 7 as an air-cooled welding torch 7 such that the cooling device 15 may, for instance, be omitted. It can thus be said that the welding apparatus 1 is at least comprised of the power source 2, and the wire feeder 8, and optionally also the cooling device 15, wherein these components may also be arranged in a common housing 11. It is, furthermore, possible to arrange or use still further parts or components such as, e.g., a grinding protection 23 on the wire feeder 8 or an optional carrier 24 on a retaining means 25 for the gas reservoir 6, etc.

It is, furthermore, known that the welding torch 7 for TIG-welding is comprised of a torch handle 26 and a torch body 27. The torch handle 26 is connected to the hose pack 21, and the torch body 27 is detachably connected to the torch handle 26 such that the torch body 27 can be exchanged. Consequently, the torch body 27 comprises a plug-in element 28 and the torch handle 26 comprises a coupling 29, which are detachably connectable via a securing element 30, thus transmitting both the welding current and the protective gas 5. Thus, a securing system 31 is formed, in particular for TIG hand torches.

It is now provided according to the invention that the securing element 30 is arranged between a gas element 32 and a current element 33 of the plug-in element 28, wherein a fixing element 34 is arranged in the coupling 29 of the torch handle 26 to engage the securing element 30, and that the gas element 32, for guiding over the fixing element 34 disposed within the coupling 29, has a smaller diameter than the securing element 30 and the current element 33, and that the securing element 30 has a flat area 35 such that the securing element 30 can be guided over the fixing element 34 by its flat area 35 while the gas element 32 is, at the same time, sealingly arranged in a gas bore 37 of the coupling 29.

The securing system 31 will be described in detail below by way of FIGS. 2 to 9, viewed together.

According to the securing system 31, the coupling 29 and the plug-in element 28 are configured to correspond to each other. Thus, the plug-in element 28 is cylindrical, with the gas element 32 having a smaller diameter than the securing element 30 and the current element 33. Correspondingly, the coupling 29 has two concentric bores. The base bore 37 substantially serves to transmit the protective gas 5, and a current bore 38 serves to transmit the welding current, each from the coupling 29 to the plug-in element 28 for TIG welding—preferably using a hand torch. Consequently, the current is substantially transmitted to the current element 33, and the gas 5 is transmitted into a gas channel of the plug-in element 28. The plug-in element 28 can thus be introduced into, and fastened in, the bores of the coupling 29.

Consequently, fastening is effected by means of the securing element 30, which secures the plug-in element 28 within the coupling in a detachable and rotational manner. To this end, the securing element 30 comprises a web 39 and a groove 36, said web 39 being disposed on the side of the gas element 32 and the groove 36 being disposed on the side of the current element 33. The diameter of the web 39 corresponds to the diameter of the current element 33, the radius of the groove 36 being substantially matched to the distance between the flat area 35 and the central axis 40 of the securing system 31—i.e., the plug-in element 28 in the present case. Furthermore, the groove 36 provides a free space for the fixing element 34 of the coupling 29. Said free space is necessary, since the diameter of the current bore 38 is reduced at this point by the fixing element 34. The free space also enables the rotation of the torch body 27. The fixing element 34, for instance, has the shape of a circular segment. The segment height of the circular segment represents the difference of the radii of the bores of the coupling 29. The radius of the gas bore 37 is thus smaller than the radius of the current bore 38 by the segment height. The fixing element 34 hence forms an elevation in the current bore 38 of the coupling 29. The diameter of the current bore 38 is correspondingly reduced at this point of the elevation. Basically, the fixing element 34 is arranged in the forward region of the current bore 38, i.e. at a distance upstream from the gas bore 37. The distance between the fixing element 34 and the gas bore 37 at least corresponds to the width of the web 39.

In order for the elevation not to affect the insertion of the plug-in element 28 into the coupling 29 as far as to a stop 41 of the plug-in element 28, the diameter of the gas element 32 is reduced and the securing element 30 is configured with a flat area 35.

The plug-in element 28 can thus be inserted into the coupling 29 in any position until the stepped transition between the gas element 32 and the web 39 of the securing element 30 strikes against the fixing element 34. In that case, the torch body 27 was thus introduced into the coupling 29 substantially in the welding position, as is apparent from FIG. 6. In this condition, a part of the gas element 32 is already within the gas bore 37. This part is located upstream of a sealing ring 42 disposed in a groove 43 of the gas element 32. The gas bore 37 is thus not yet sealed and the torch body 27 not yet secured.

Figure 6:
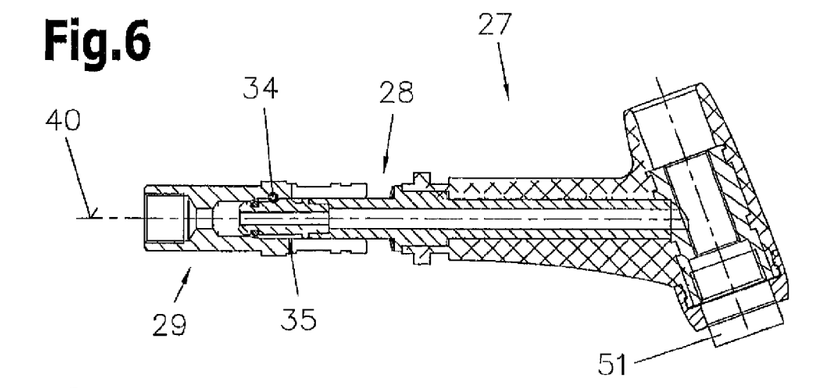
FIGS. 6 to 8 are schematic sectional illustrations of the securing element in different positions.

Consequently, the torch body 27, and hence the plug-in element 28, are manually rotated by the user until the flat area 35 forms a plane with the chord of the circular segment.

Figure 7:
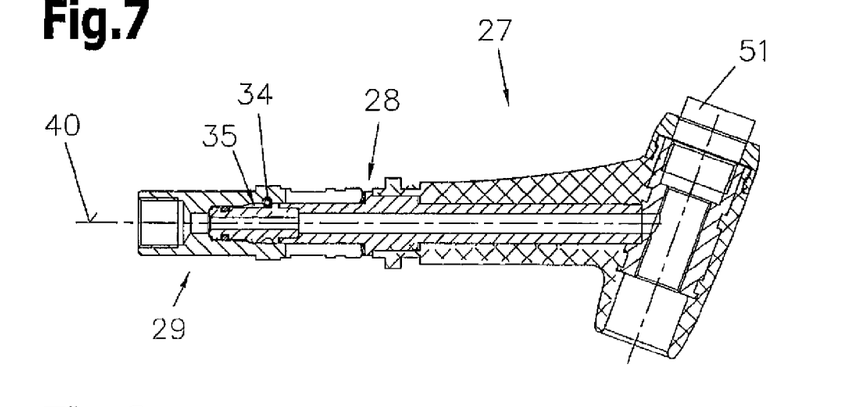

After having been rotated into the correct position, the torch body 27 can be inserted as far as to the stop 41 (FIG. 7). In doing so, pushing in of the groove 36 into the plane of the fixing element 34, and of the sealing ring 42 into the gas bore 27, are simultaneously performed until the stop 41 of the plug-in element 28 contacts the end side of the coupling 29. The sealing ring 42 has an outer diameter ranging between the diameter of the gas element 32 and the diameter of the web 39. The sealing ring 42 is thus accordingly constricted during its insertion into the gas bore 37, thus ensuring tightness.

In the plugged-together state, the torch body 27 can be manually rotated and secured (FIG. 8), being held by a cone 44. The cone 44 is disposed between the web 39 and the groove 36. The cone 44 in addition compensates for the different diameters of the web 39 and the groove 36, constituting a transition between the same. The torch body 27 is thus held by the cone 44 being pressed against the fixing element 34. If the fixing element 34 is, for instance, resiliently configured, it will exert an additional force on the cone 44 such that the position of the torch body 27 will be fixed with elevated force. It will thus also be ensured that the torch body 27 will be held in the adjusted position unchanged during a welding operation.

Figure 8:
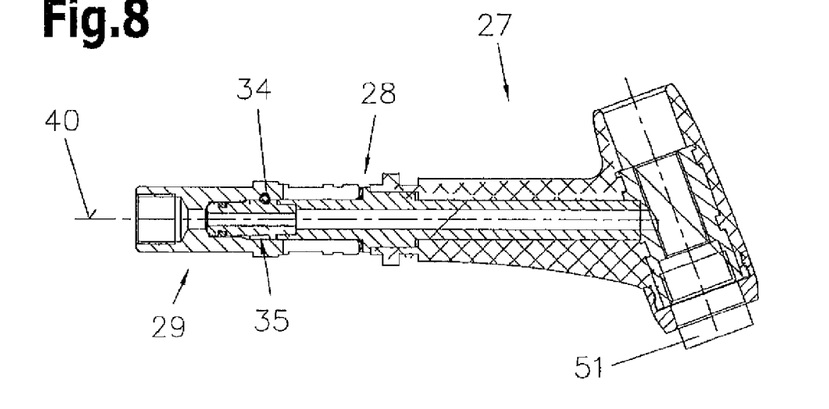

The position of the torch body 27 can be substantially arbitrarily adapted and/or adjusted to the intended welding operation by rotating the torch body 27 and thereby effecting locking. The positions for the torch body 27 can thus be arbitrarily selected on the length of the cone 44. Said length is substantially formed by the periphery, with the flat area 35 interrupting the periphery of the circle and hence shortening the cone 44. Thereby, an angle for continuously adjusting said position is accordingly preset. Said angle, for instance, is in the order of 320°.

The holding force can be additionally increased by providing a spring element 45, e.g. a spring ring, on the plug-in element 28 in front of the stop 41. Said spring element 45 exhibits accordingly resilient and electrically well conducting properties. In the assembled state, the spring ring is thus disposed between the stop 41 and the end side of the coupling 29 such that the plug-element 28 is substantially pressed out of the coupling 29 and the cone 44 is increasingly pressed against the fixing element 34.

The fixation of the position of the torch body can also be effected, and/or at least assisted, in that an isolated friction surface is provided both in the torch body 27 and in the torch handle 26 in the region of the stop 41 such that a friction force will be exerted. The friction force, therefore, has to be overcome in order to adjust the position of the torch body 27.

The securing element 30 and the gas element 32 can, moreover, be formed by a separate piece which, in a manner corresponding to the current element 33, is, for instance, connected by a solder and/or compression joint. The separate piece is, for instance, made of steel, chromium-nickel or the like—i.e. of a hard material—, such that the material will not be deformed by the holding force. By contrast, the current element 33 is, for instance, made of copper or brass so as to ensure a good current conduction.

Figure 2:
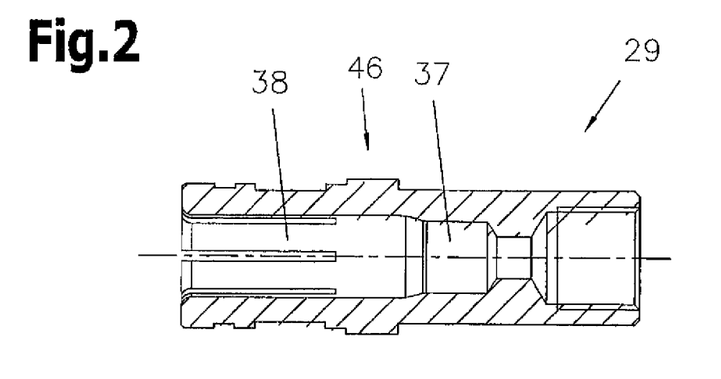
FIG. 2 is a schematic sectional illustration of the coupling of the securing system according to the invention.
Figure 3:
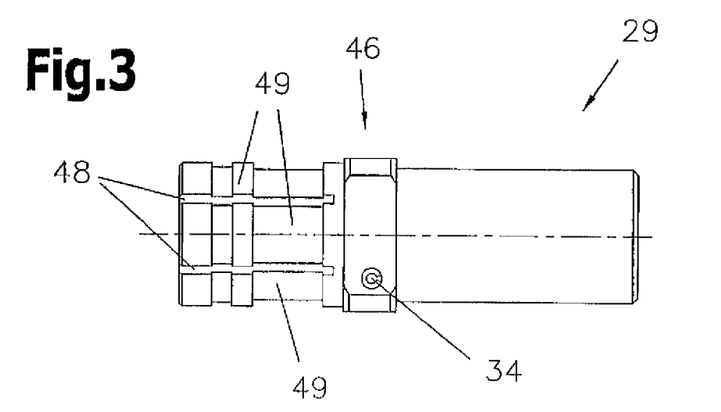
FIG. 3 is a schematic side view of the coupling.
Figure 4:
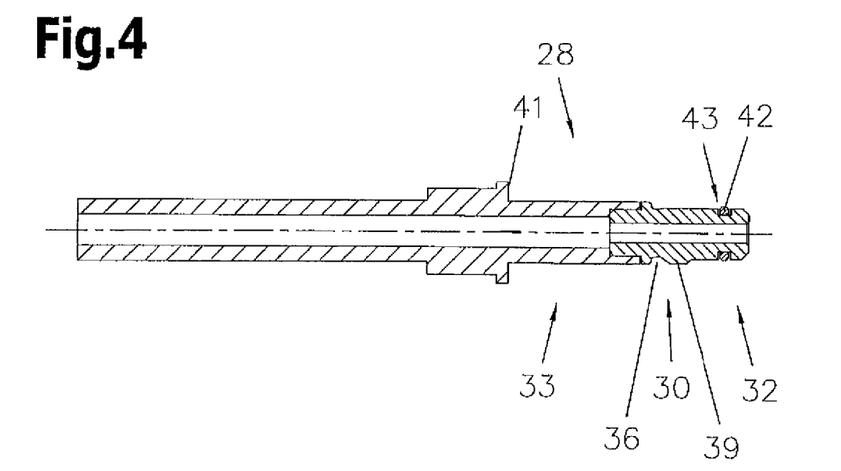
FIG. 4 is a schematic sectional illustration of the plug-in element of the securing system according to the invention.
Figure 5:
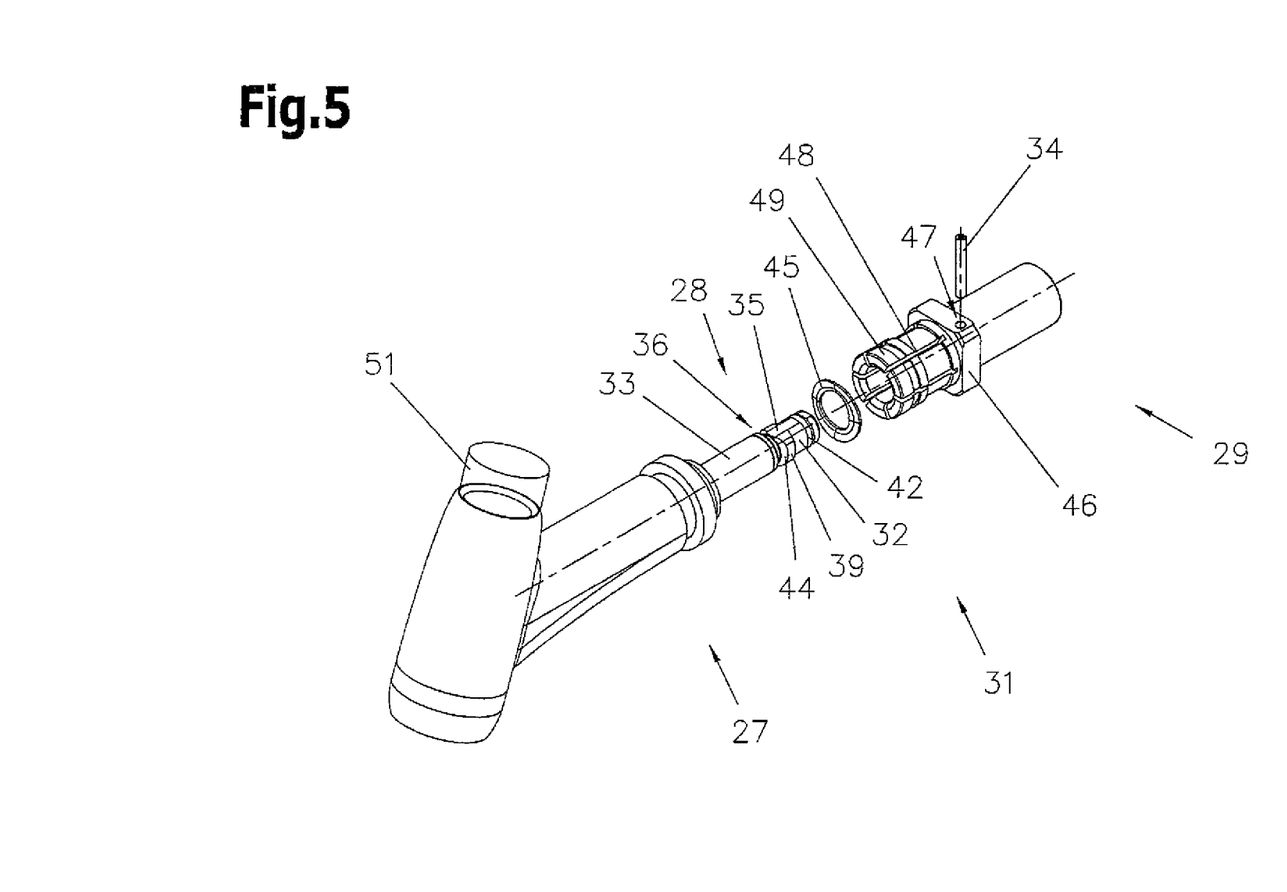
FIG. 5 illustrates the securing system according to the invention in a schematic exploded view.

In principle, the coupling 29 is also cylindrically shaped. The feed lines for the welding current and the protective gas 5, whose connections are substantially known from the prior art, are arranged in one end region of the cylinder. Consequently, the gas bore 37 and the current bore 38 are provided in the other end region. A parallelepiped 46 is substantially arranged between these end regions, i.e. substantially in the center of the coupling 29. Said parallelepiped 46 serves to mount the fixing element 34. To this end, the parallelepiped 46, for instance, comprises a fixing bore 47, which is offset by 90° relative to the central axis 40 of the securing system 31—i.e. the coupling 29 in the present case—and is thus radially arranged. A part of the fixing bore 47 intersects with the current bore 38. This means that, for instance, the central axis of the fixing bore 47 intersects with the periphery of the current bore 38 in one point. In that case, the central axis of the fixing bore 47 thus corresponds to a tangent. The central axis of the fixing bore 47 can also be configured as a passant. The fixation of the fixing element 34 in the fixing bore 47 will result in the circular segment being in the current bore 38 in the region of the intersection of the current bore 38 and the fixing bore 47. The fixing element 34 is, for instance, formed by a spring bushing, a clamping sleeve or the like. Thus, also the fixing element 34 is cylindrically shaped, wherein the fixing element 34 may also exhibit resilient properties. The circular segment will thus be formed at a cut through the parallelepiped 46. When viewed three-dimensionally, this is a spherical segment in elliptic form rather than a circular segment having an elliptic form.

Furthermore, several slots 48 are provided in the jacket of the current bore 38, thus forming cheeks 49. Thereby, the diameter of the current bore 38 will be at least slightly reduced. This will be accomplished by the reduction of the internal stress of the jacket. When inserting the plug-in element 28, the cheeks 49 formed by the slots 48 will consequently be pressed apart, thus causing the cheeks 49 to be pressed against the plug-in element 28 so as to provide an enhanced current conduction. In addition to, or instead of, the slots 48, fins can also be arranged in the current bore 38, which will likewise enhance the current conduction.

Figure 9:
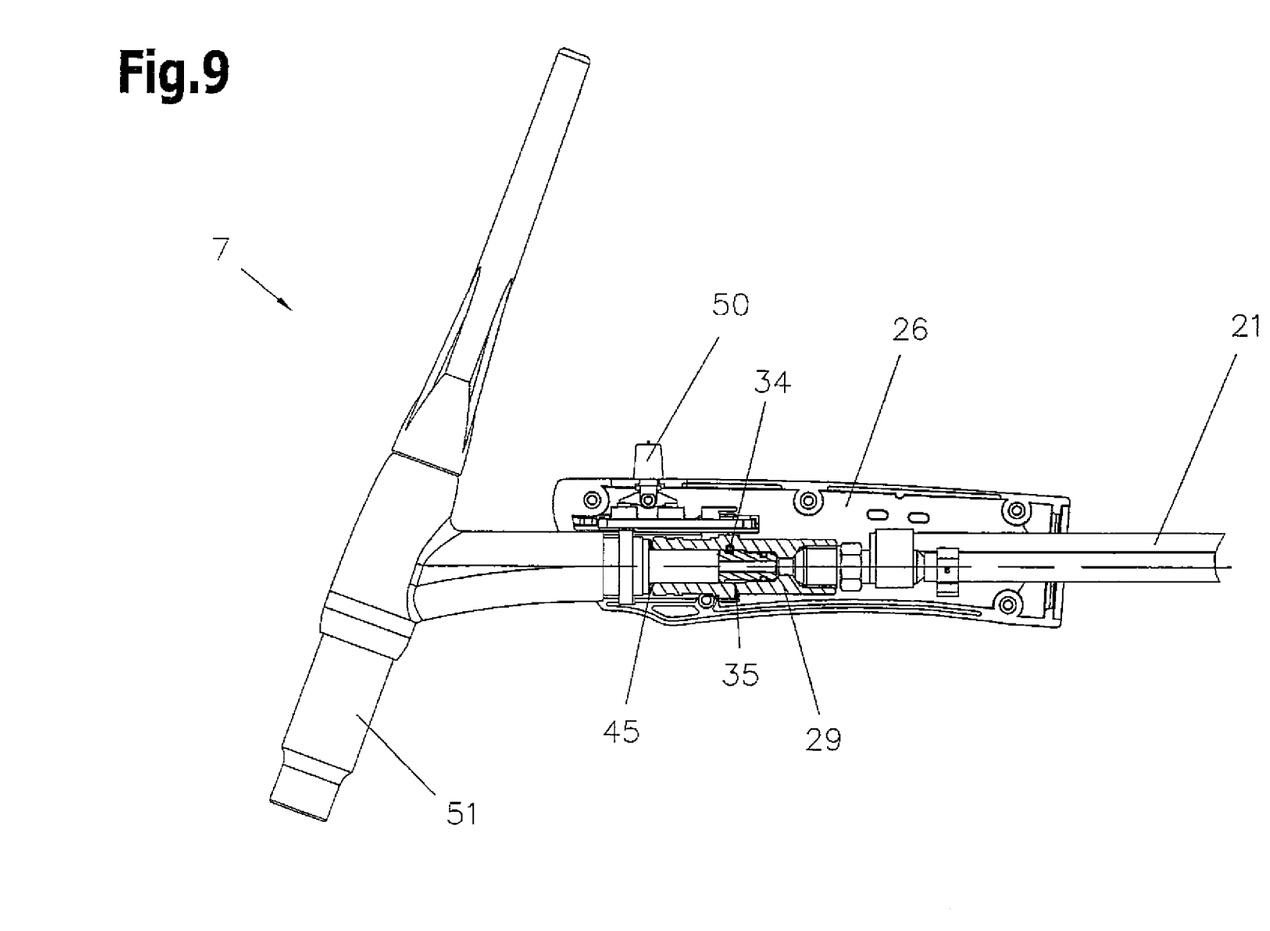
FIG. 9 depicts the securing system in a TIG welding torch.

The fixing element 34 is preferably arranged in the upper part of the torch handle 26. The fixing element 34 is thus substantially disposed below a torch button 50, said torch button 50 being correspondingly arranged on top of the torch handle 26.

By contrast, the flat area 35 on the plug-in element 28 is oriented downwards, i.e. in the direction of a gas nozzle 51 of the torch body 27.

It is thus provided that the torch body 27 is rotated by substantially 180° relative to the usual welding position and inserted into the coupling 29 in the torch handle 26 by the flat area 35 of the securing element 30 via the fixing element 34. Hence results that the position of the torch body 27 for welding operations is adjustable by the rotational movement substantially in the lower half circle or angular range such that any unintentional detachment of the torch body 27 will be excluded. In a similar manner, the torch body 27 is secured by the rotational movement, and the welding position is adjusted via the rotational movement. It goes without saying that the securing system 31 according to the invention is configured for use both in gas-cooled and in water-cooled welding torches 27.

The invention claimed is:

1. A securing system for detachably securing a torch body of a TIG welding torch to a torch handle and for transmitting at least the media gas and current, comprising: a cylindrical plug-in element connected to the torch body and a coupling connected to the torch handle, said coupling detachably receiving the plug-in element, wherein the plug-in element comprises a gas element and a current element and an interposed securing element including a flat area, a circumferential groove and a web, wherein the gas element has a diameter smaller than those of the securing element and the current element, and wherein the coupling comprises a gas bore and a fixing element, via which fixing element the securing element with the flat area can be guided into a plugged-together state until the gas element is sealingly arranged in the gas bore of the coupling, wherein, in the plugged-together state, the plug-in element is adjustably rotatable relative to the coupling, with the fixing element being guided in the groove of the plug-in element.

2. A securing system according to claim 1, wherein a cone that tapers towards the groove is arranged between the groove and the web of the securing element of the plug-in element.

3. A securing system according to claim 1, wherein a groove for a sealing ring is provided in the gas element of the plug-in element.

4. A securing system according to claim 1, wherein a flat area in alignment with the flat area of the securing element is provided on the gas element of the plug-in element.

5. A securing system according to claim 1, wherein the coupling is cylindrically shaped and a parallelepiped is arranged in the region of the fixing element.

6. A securing system according to claim 1, wherein a stop is arranged on the end of the plug-in element opposite the gas element.

7. A securing system according to claim 6, further comprising a spring element positioned in front of the stop.

8. A securing system according to claim 1, wherein two concentric bores are provided in the coupling for the plug-in element, one bore being shaped as a gas bore and the further bore being shaped as a current bore.

9. A securing system according to claim 8, wherein the fixing element in the coupling is arranged in the current bore in the form of a circular segment and reduces a diameter of the current bore at this point.

10. A torch body with a securing system of a TIG welding torch for detachably securing the torch body of the TIG welding torch to a torch handle and for transmitting at least the media gas and current, the securing system comprising a cylindrical plug-in element connected to the torch body and a coupling connected to the torch handle, said coupling detachably receiving the plug-in element, wherein the plug-in element comprises a gas element and a current element and an interposed securing element including a flat area, a circumferential groove and a web, wherein the gas element has a diameter smaller than those of the securing element and the current element, and wherein the coupling comprises a gas bore and a fixing element, via which fixing element the securing element with the flat area can be guided into a plugged-together state until the gas element is sealingly arranged in the gas bore of the coupling, wherein, in the plugged-together state, the plug-in element is adjustably rotatable relative to the coupling, with the fixing element being guided in the groove of the plug-in element and wherein in the plugged-together state, the plug-in element is adjustably rotatable relative to the coupling of the securing system.

11. A torch body according to claim 10, wherein a cone that tapers towards the groove is arranged between the groove and the web of the securing element of the plug-in element.

12. A torch body according to claim 10, wherein a groove for a sealing ring is provided in the gas element of the plug-in element.

13. A TIG welding torch including a torch handle and a torch body according to claim 10, wherein the plug-in element, which is connected to the torch body, is guidable into the torch handle in a plugged-together state in a manner rotated by 180° relative to the usual welding position and with the flat area of the securing element over the fixing element, and the plug-in element, which is connected to the torch body, is securable by a rotational movement, and, in the plugged-together state, the plug-in element is adjustably rotatable relative to the coupling, with the welding position being adjustable via said rotational movement.

14. A TIG welding torch according to claim 13, wherein the position of the torch body is adjustable at an angle that is preset by the securing element of the plug-in element.

\* \* \* \* \*